(12) United States Patent
Tang (10) Patent No.: US 11,647,446 B2
(45) Date of Patent: May 9, 2023

(54) INFORMATION TRANSMISSION METHOD, NETWORK DEVICE, AND TERMINAL DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 27 days.

(21) Appl. No.: 16/879,582

(22) Filed: May 20, 2020

(65) Prior Publication Data

US 2020/0288379 A1  Sep. 10, 2020

Related U.S. Application Data

(63) Continuation of application No. PCT/CN2017/112185, filed on Nov. 21, 2017.

(51) Int. Cl.
*H04W 48/12* (2009.01)
*H04W 8/08* (2009.01)

(52) U.S. Cl.
CPC .............. *H04W 48/12* (2013.01); *H04W 8/08* (2013.01)

(58) Field of Classification Search
CPC ................................ H04W 8/08; H04W 48/12
USPC ......................................................... 370/328
See application file for complete search history.

(56) References Cited

U.S. PATENT DOCUMENTS

| 9,787,527 | B1 | 10/2017 | Goel et al. | |
|---|---|---|---|---|
| 2010/0091701 | A1* | 4/2010 | Youn | H04W 48/10 |
| | | | | 342/357.41 |
| 2013/0094407 | A1* | 4/2013 | Manian | H04W 40/20 |
| | | | | 370/328 |
| 2014/0099945 | A1 | 4/2014 | Singh et al. | |
| 2015/0119101 | A1 | 4/2015 | Cui et al. | |
| 2016/0337950 | A1 | 11/2016 | Navas Cornejo et al. | |
| 2017/0026824 | A1* | 1/2017 | Kim | H04W 76/12 |
| 2018/0270840 | A1* | 9/2018 | Griot | H04L 5/0055 |
| 2018/0317157 | A1* | 11/2018 | Baek | H04W 76/22 |

(Continued)

FOREIGN PATENT DOCUMENTS

| CN | 101267319 A | 9/2008 |
|---|---|---|
| CN | 104066154 A | 9/2014 |
| CN | 104640224 A | 5/2015 |

(Continued)

OTHER PUBLICATIONS

Summons to attend Oral Proceedings Pursuant to Rule 115(1) EPC issued in corresponding European Application No. 17 933 017.0, mailed Apr. 28, 2021, 5 pages.

(Continued)

*Primary Examiner* — Rownak Islam
(74) *Attorney, Agent, or Firm* — Bayes PLLC (57) ABSTRACT

Embodiments of this application disclose an information transmission method, a network device, and a terminal device, thereby helping reduce signaling overheads. The method includes: determining, by a network device, a target policy corresponding to a terminal device according to current time information and/or position information of the terminal device; and sending, by the network device, the target policy to the terminal device.

6 Claims, 4 Drawing Sheets

500

A terminal device receives a plurality of policies sent by a network device, where each policy corresponds to specific time information and/or specific position information — S510

The terminal device determines a target policy in the plurality of policies according to current time information and/or position information of the terminal device — S520

(56) References Cited

U.S. PATENT DOCUMENTS

2019/0373441 A1* 12/2019 Ryu .................... H04W 48/18

FOREIGN PATENT DOCUMENTS

| CN | 105027629 A | 11/2015 |
| CN | 107231183 A | 10/2017 |
| CN | 107231224 A | 10/2017 |
| JP | 2020515159 A | 5/2020 |
| WO | WO2015106817 A1 | 7/2015 |
| WO | 2016095974 A1 | 6/2016 |
| WO | 2018/017529 A1 | 1/2018 |

OTHER PUBLICATIONS

Request for SIPO Patent Priority Review issued in corresponding Chinese Application No. 202010408153.5, dated Apr. 21, 2021, 6 pages.

First Office action issued in corresponding Chinese Application No. 202010408153.5, dated Jun. 21, 2021, 18 pages.

First Office action issued in corresponding India Application No. 202017025604, dated Jun. 25, 2021, 5 pages.

Chandramouli, Devaki et al., 5G for the Connected World, published 2019, John Wiley & Sons Ltd., 506 pages.

Ericsson, "5G Event Triggers," 3GPP TSG-CT WG3 Meeting #93, C3-176027, Reno, USA, Nov. 27-Dec. 1, 2017, 8 pgs.

Guangdong OPPO Mobile Telecommunications Corp. Ltd., Extended European Search Report, EP17933017.0, dated Jul. 30, 2020, 12 pgs.

Huawei et al., "Non-3GPP ANDS Policy Transfer Mechanism," SA WG2 Meeting #120, S2-172037, Mar. 27-31, 2017, Busan, South Korea, 4 pgs.

Huawei et al., "TS 23.501 The Function Description of 5G Policy Framework," Temporary Document, SA WG2 Meeting #123, S2-177690, Oct. 23-27, 2017, Ljubljana, Slovenia, 2 pgs.

Magnus Olsson et al., "EPC and 4G Packet Networks: Driving the Mobile Broadband Revolution," EPC and 4G Packet Networks, Elsevier, XP055716397, Jan. 1, 2013, 6 Pgs-.

Nokia, "TS 23.503: Reference Architecture of Policy Framework," Temporary Document, SA WG2 Meeting #123, S2-178172, Oct. 23-27, 2017, Ljubljana, Slovenia, 5 pgs.

OPPP et al., "The Delivery of UE Policy", Temporary Document, SA WG2 Meeting #124, S2-178445, Nov. 27-Dec. 1, 2017, Reno, Nevada, USA, 2 pgs.

Qualcomm Incorporated et al., TS 23.503: Transport of Policy Rules from PCF to UE, S2-178088, Temporary Document, SA WG2 Meeting #123, S2-178088, Oct. 23-27, 2017, Ljubljana, Slovenia, 4 pgs.

International Search Report and Written Opinion, PCT/CN2017/112185, dated Jul. 31, 2018, 10 pgs.

Notification of Reason for Refusal issued in corresponding Korean Application No. 10-2020-7017221, dated Aug. 19, 2021, 9 pages.

The Second Office Action issued in corresponding Chinese Application No. 202010408153.5, dated Sep. 18, 2021, 14 pages.

Notice of Reasons for Refusal issued in corresponding Japanese Application No. 2020-545406, dated Nov. 12, 2021, 8 pages.

Decision of Rejection issued in corresponding Chinese Application No. 202010408153.5, dated Dec. 10, 2021, 15 pages.

Notification Concerning Date of Oral Proceedings issued in corresponding European Application No. 17933017.0, dated Nov. 9, 2021; 8 pages.

"3rd Generation Partnership Project; Technical Specification Group Services and System Aspects; Policy and Charging Control Framework for the 5G System; Stage 2 (Release 15)", 3GPP TS 23.503 V0.4.0 (Nov. 2017), 53 pages.

"3rd Generation Partnership Project; Technical Specification Group Services and System Aspects; Architecture enhancements for non-3GPP accesses (Release 15)", 3GPP TS 23.402 V15.1.0 (Sep. 2017), 312 pages.

"3rd Generation Partnership Project; Technical Specification Group Services and System Aspects; Procedures for the 5G System; Stage 2 (Release 15)", 3GPP TS 23.502 V1.3.0 (Nov. 2017), 215 pages.

Notice of Final Rejection issued in corresponding Korean Application No. 10-2020-7017221, dated Feb. 24, 2022, 3 pages.

Extended European Search Report issued in corresponding European Application No. 21214657.5, dated Apr. 4, 2022, 8 pages.

Reexamination Notice issued in corresponding Chinese Application No. 202010408153.5, dated Aug. 31, 2022.

Reexamination Notice issued in corresponding Chinese Application No. 202010408153.5, dated Nov. 2, 2022.

Decision of Reexamniation issued in corresponding Chinese Application No. 202010408153.5, dated Jan. 9, 2023.

* cited by examiner

| A network device determines a target policy corresponding to a terminal device according to current time information and/or position information of the terminal device | ～S210 |

| The network device sends the target policy to the terminal device | ～S220 |

| A network device determines a plurality of policies, where each policy corresponds to specific time information and/or specific position information | ～S310 |

| The network device sends the plurality of policies to a terminal device | ～S320 |

INFORMATION TRANSMISSION METHOD, NETWORK DEVICE, AND TERMINAL DEVICE

CROSS-REFERENCE TO RELATED APPLICATION

This application is a continuation application of PCT Patent Application No. PCT/CN2017/112185, entitled "INFORMATION TRANSMISSION METHOD, NETWORK DEVICE, AND TERMINAL DEVICE" filed on Nov. 21, 2017, which is incorporated by reference in its entirety.

TECHNICAL FIELD

Embodiments of this application relate to the field of communications, and more specifically, to an information transmission method, a network device, and a terminal device.

RELATED ART

A user equipment (UE) policy is introduced in the 3rd Generation Partnership Project (3GPP) Rel-15 and used to help a terminal device select a network and establish a protocol data unit (PDU).

A UE policy may be delivered by a network device to a terminal device. However, when a network is congested or the UE policy has a relatively large amount of data, how to configure the UE policy for the terminal device is an issue that is worthy of research.

SUMMARY

An information transmission method, a network device, and a terminal device are provided, so that a data amount of a policy that needs to be delivered can be reduced, thereby reducing signaling overheads.

According to a first aspect, an information transmission method is provided, the method including:

determining, by a network device, a target policy corresponding to a terminal device according to current time information and/or position information of the terminal device; and sending, by the network device, the target policy to the terminal device.

Therefore, in the information transmission method in the embodiments of this application, a network device may determine, according to at least one of a current time and a position of the terminal device, a target policy used by a terminal device. Therefore, it is not necessary to deliver all policies to the terminal device, thereby helping reduce signaling overheads.

It should be understood that, in the embodiments of this application, the target policy may be a target policy for a time range and/or a particular area range. If the current time does not exceed the time range or the current position does not exceed the area range, the terminal device can still use the target policy. If the current time is not within the time range corresponding to the target policy or the current position is not within the area range corresponding to the target policy, the network device may be triggered to adjust or update a policy corresponding to the terminal device.

With reference to the first aspect, in some possible implementations of the first aspect, the position information includes at least one of the following:

a presence reporting area (PRA) defined in the 3GPP, at least one tracking area identity (TAI), at least one registration area identity (RAI), and geographical position information from global positioning system (GPS) positioning.

With reference to the first aspect, in some possible implementations of the first aspect, the target policy includes a wireless local area network selection policy (WLANSP) and/or a user equipment route selection policy (URSP).

With reference to the first aspect, in some possible implementations of the first aspect, the target policy includes at least one rule in the WLANSP and/or at least one rule in the URSP.

With reference to the first aspect, in some possible implementations of the first aspect, the network device is a policy control function (PCF) entity, and the method further includes:

obtaining, by the network device, the position information of the terminal device from an access and mobility management function (AMF).

Optionally, the target policy corresponds to a first time range, and the method further includes:

if the current time is not within the first time range, determining, by the network device, an updated target policy according to the current time information, and sending the updated target policy to the terminal device.

That is, the network device may adjust or update, according to a change in time, the target policy configured for the terminal device.

With reference to the first aspect, in some possible implementations of the first aspect, the method further includes:

if the position information of the terminal device changes, determining, by the network device, an updated target policy according to changed position information of the terminal device, and sending the updated target policy to the terminal device.

That is, the network device may adjust or update, according to a change in a position of the terminal device, the target policy configured for the terminal device.

With reference to the first aspect, in some possible implementations of the first aspect, the target policy is used to indicate a parameter used by the terminal device to select a network or establish a PDU session.

With reference to the first aspect, in some possible implementations of the first aspect, the determining, by a network device, a target policy corresponding to a terminal device according to current time information and/or position information of the terminal device includes:

determining, by the network device according to the current time information and/or the position information of the terminal device and a correspondence, the target policy corresponding to the terminal device.

Optionally, the correspondence may be in a table form, a tree form or the like, and the correspondence may be prestored in the network device, or the network device may adjust the correspondence.

For example, the correspondence is a first correspondence between position information of the terminal device and a policy, or a second correspondence between time information and a policy, or a third correspondence between time information and position information of the terminal device and a policy.

According to a second aspect, an information transmission method is provided, the method including:

determining, by a network device, a plurality of policies, where each policy corresponds to specific time information and/or specific position information; and sending, by the network device, the plurality of policies to a terminal device.

Therefore, the network device may determine different policies according to different time periods and/or different positions, and then may send the determined policies to the terminal device, so that the terminal device determines, according to current time information and/or current position information of the terminal device, a policy to use.

With reference to the second aspect, in some possible implementations of the second aspect, the position information includes at least one of the following:

a PRA defined in the 3GPP, at least one TAI, at least one RAI, and geographical position information from GPS positioning.

With reference to the second aspect, in some possible implementations of the second aspect, each policy includes a WLANSP and/or a URSP.

With reference to the second aspect, in some possible implementations of the second aspect, each policy includes at least one rule in the WLANSP and/or at least one rule in the URSP.

With reference to the second aspect, in some possible implementations of the second aspect, each policy is used to indicate a parameter used by the terminal device to select a network or establish a PDU session.

According to a third aspect, an information transmission method is provided, the method including:

receiving, by a terminal device, a target policy sent by a network device, where the target policy is determined by the network device according to current time information and/or position information of the terminal device; and selecting, by the terminal device, a network or establishing a PDU session according to the target policy.

With reference to the third aspect, in some possible implementations of the third aspect, the position information includes at least one of the following:

a PRA defined in the 3GPP, at least one TAI, at least one RAI, and geographical position information from GPS positioning.

With reference to the third aspect, in some possible implementations of the third aspect, the target policy includes a WLANSP and/or a URSP.

With reference to the third aspect, in some possible implementations of the third aspect, the target policy includes at least one rule in the WLANSP and/or at least one rule in the URSP.

With reference to the third aspect, in some possible implementations of the third aspect, the method further includes:

if the position information of the terminal device changes, receiving, by the terminal device, an updated target policy sent by the network device, where the updated target policy is determined according to changed position information of the terminal device.

According to a fourth aspect, an information transmission method is provided, including:

receiving, by a terminal device, a plurality of policies sent by a network device, where each policy corresponds to specific time information and/or specific position information; and determining, by the terminal device, a target policy in the plurality of policies according to current time information and/or position information of the terminal device; and selecting, by the terminal device, a network or establishing a PDU session according to the target policy.

With reference to the fourth aspect, in some possible implementations of the fourth aspect, the position information includes at least one of the following:

a PRA defined in the 3GPP, at least one TAI, at least one RAI, and geographical position information from GPS positioning.

With reference to the fourth aspect, in some possible implementations of the fourth aspect, each policy includes a WLANSP and/or a URSP.

With reference to the fourth aspect, in some possible implementations of the fourth aspect, each policy includes at least one rule in the WLANSP and/or at least one rule in the URSP.

With reference to the fourth aspect, in some possible implementations of the fourth aspect, if the plurality of policies do not include a policy for the current time information and/or the position information, the method further includes:

determining, by the terminal device, a default policy as the target policy; or sending, by the terminal device, a request message to the network device, where the request message is used to request a policy for the current time information and/or the position information.

According to a fifth aspect, a network device is provided, configured to perform the method according to any one of the first aspect or the possible implementations of the first aspect, or configured to perform the method according to any one of the second aspect or the possible implementations of the second aspect. Specifically, the network device includes units configured to perform the method according to any one of the first aspect or the possible implementations of the first aspect, or the network device includes units configured to perform the method according to any one of the second aspect or the possible implementations of the second aspect.

According to a sixth aspect, a network device is provided. The network device includes a memory, a processor, an input interface, and an output interface. The memory, the processor, the input interface, and the output interface are connected by using a bus system. The memory is configured to store an instruction. The processor is configured to execute the instruction stored in the memory, is configured to perform the method according to any one of the first aspect or the possible implementations of the first aspect, or is configured to perform the method according to any one of the second aspect or the possible implementations of the second aspect.

According to a seventh aspect, a terminal device is provided, configured to perform the method according to any one of the third aspect or the possible implementations of the third aspect, or configured to perform the method according to any one of the fourth aspect or the possible implementations of the fourth aspect. Specifically, the terminal device includes units configured to perform the method according to any one of the third aspect or the possible implementations of the third aspect, or the terminal device includes units configured to perform the method according to any one of the fourth aspect or the possible implementations of the fourth aspect.

According to an eighth aspect, a terminal device is provided, the terminal device including: a memory, a processor, an input interface, and an output interface. The memory, the processor, the input interface, and the output interface are connected by using a bus system. The memory is configured to store an instruction. The processor is configured to execute the instruction stored in the memory, and is configured to perform the method according to any one of the third aspect or the possible implementations of the third aspect or is configured to perform the method according to any one of the fourth aspect or the possible implementations of the fourth aspect.

According to a ninth aspect, a computer storage medium is provided, configured to store a computer software instruction used to perform the method according to any one of the first to fourth aspects or the possible implementations of the first to fourth aspects, and includes a program designed to perform the foregoing aspects.

According to a tenth aspect, a computer program product including an instruction is provided, and when the computer program product is executed on a computer, the computer is enabled to perform the method according to any one of the first to fourth aspects or the possible implementations of the first to fourth aspects.

DETAILED DESCRIPTION

The technical solutions according to embodiments of this application are described below with reference to the accompanying drawings in the embodiments of this application.

The technical solutions according to the embodiments of this application may be applied to a variety of communications systems, such as a Long Term Evolution (LTE) system, an LTE Frequency Division Duplex (FDD) system, an LTE Time Division Duplex (TDD) system, a future 5G system or the like.

Figure 1:
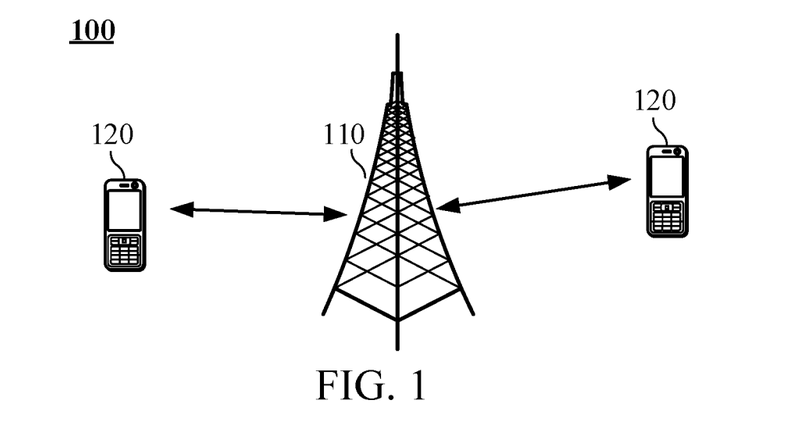
FIG. 1 is a schematic diagram of an application scenario according to an embodiment of this application.

FIG. 1 shows a wireless communications system 100 to which embodiments of this application are applied. The wireless communications system 100 may include a network device 110. The network device 100 may be a device that communicates with a terminal device. The network device 100 may provide communication coverage for a specified geographic area, and may communicate with a terminal device (for example, UE) located in the coverage. Optionally, the network device 100 may be an evolved NodeB (eNB or eNodeB) in an LTE system. Alternatively, the network device may be a relay station, an access point, an in-vehicle device, a wearable device, a network device in a future 5G network, a network device in a future evolved public land mobile network (PLMN) or the like.

Optionally, the network device 110 may be a 5G core network device, for example, a PCF, an AMF or the like.

The wireless communications system 100 further includes at least one terminal device 120 located in the coverage of the network device 110. The terminal device 120 may be mobile or fixed. Optionally, the terminal device 120 may be an access terminal, UE, a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

Figure 2:
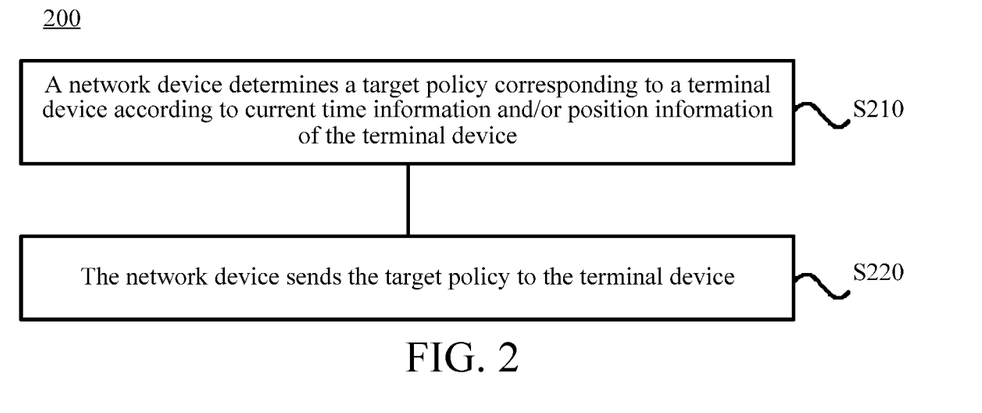
FIG. 2 is a schematic flowchart of an information transmission method according to an embodiment of this application.

FIG. 2 is a schematic flowchart of an information transmission method 200 according to an embodiment of this application. The method 200 may be performed by the network device in the communications system 100 shown in FIG. 1. For example, the network device may be a PCF entity. As shown in FIG. 2, the method 200 may include the following content:

S210: The network device determines a target policy corresponding to a terminal device according to current time information and/or position information of the terminal device.

S220: The network device sends the target policy to the terminal device.

Optionally, in this embodiment of this application, the target policy may be configured to indicate a parameter used by the terminal device to select a network or establish a PDU session. That is, the terminal device may select a network or establish a PDU session according to the target policy. Alternatively, the target policy may be a policy used by the terminal device to perform another operation. This is not limited in this embodiment of this application.

Specifically, the network device may determine a target policy in candidate policies. For example, the candidate policies may include a plurality of rules. The network device may determine at least one rule according to at least one of a current time and a position of the terminal device. The at least one rule constitutes a target policy corresponding to the terminal device, and then the network device may deliver the determined the target policy to the terminal device, so that the terminal device may select a network or establish a PDU session according to the target policy.

Therefore, in the information transmission method in this embodiment of this application, a network device may determine, according to at least one of a current time and a position of the terminal device, a target policy used by a terminal device. Therefore, it is not necessary to deliver all policies to the terminal device, thereby helping reduce signaling overheads.

Optionally, in this embodiment of this application, the position information of the terminal device may have a first correspondence with a policy, or the time information may have a second correspondence with a policy, or the time information and the position information of the terminal device may have a third correspondence with a policy.

Optionally, the correspondence may be in a table form, a tree form or the like, and the correspondence may be prestored in the network device, or the network device may adjust the correspondence.

In a specific embodiment, S210 may include:

determining, by the network device according to the current time information and/or the position information of the terminal device and a correspondence, the target policy corresponding to the terminal device.

The correspondence may be the first correspondence, the second correspondence or the third correspondence.

For example, if the candidate policies include ten rules, marked as a rule 1 to a rule 10, the network device may prestore the first correspondence between position information and a rule. For example, the first correspondence may be shown in Table 1.

TABLE 1

| Position 1 | Rule 1 to Rule 3 |
| Position 2 | Rule 3 to Rule 5 |
| Position 3 | Rule 6 to Rule 8 |
| Position 4 | Rule 5 to Rule 9 |
| Position 5 | Rule 9 to Rule 10 |
| Other positions | Rule 10 |

It should be understood that, each position in Table 1 may represent a particular position range. The network device may determine a corresponding rule according to a position range to which a current position of the terminal device belongs, so that a policy constituted by the determined rule may be sent to the terminal device. For example, if the network device determines that the terminal device is currently in a position range indicated by the position 1, the network device may determine that the target policy includes the rule 1 to the rule 3, so that the network device may send only the rule 1 to the rule 3 to the terminal device. It is not necessary to send all the ten rules to the terminal device.

For another example, the network device may prestore the second correspondence between time information and a rule. For example, the second correspondence may be shown in Table 2.

TABLE 2

| Time period 1 | Rule 1 to Rule 3 |
| Time period 2 | Rule 3 to Rule 5 |
| Time period 3 | Rule 6 to Rule 9 |
| Other time periods | Rule 10 |

It should be understood that, each time period in Table 2 may represent a particular time range. The network device may determine a corresponding rule according to a time period to which the current time belongs, so that a policy constituted by the determined rule may be sent to the terminal device. For example, if the network device determines that the current time belongs to the time period 1, the network device may determine that the target policy includes the rule 1 to the rule 3, so that the network device may send only the rule 1 to the rule 3 to the terminal device. It is not necessary to send all the ten rules to the terminal device.

Similarly, the network device may also prestore a correspondence between time information and position information and a rule, so that the network device may determine a corresponding rule according to a current time and a position of the terminal device, so that a policy constituted by the determined rule may be sent to the terminal device. It is not necessary to send all the rules to the terminal device, thereby helping reduce signaling overheads.

It should be understood that, in this embodiment of this application, the target policy may be a target policy for a time range and/or a particular area range. If the current time does not exceed the time range or the current position does not exceed the area range, the terminal device can still use the target policy. If the current time is not within the time range corresponding to the target policy or the current position is not within the area range corresponding to the target policy, the network device may be triggered to adjust or update a policy corresponding to the terminal device.

Optionally, the target policy corresponds to a first time range, and the method 200 further includes:

if the current time is not within the first time range, determining, by the network device, an updated target policy according to the current time information, and sending the updated target policy to the terminal device.

That is, the network device may adjust or update, according to a change in time, the target policy configured for the terminal device.

Optionally, the target policy corresponds to a first position range, and the method 200 further includes:

if the current position of the terminal device is not within the first position range, determining, by the network device, an updated target policy according to current position information of the terminal device, and sending the updated target policy to the terminal device.

That is, the network device may adjust or update, according to a change in a position of the terminal device, the target policy configured for the terminal device.

Optionally, in some embodiments, the network device is a PCF, and the method further includes:

obtaining, by the network device, the position information of the terminal device from an AMF.

That is, the AMF may report the position information of the terminal device to the PCF. If the position information of the terminal device changes, the network device may determine, according to changed position information, that the policy needs to be updated, an updated target policy is determined according to the changed position information, and the updated target policy is then delivered to the terminal device.

Optionally, the position information in this embodiment of this application may be represented by using at least one of the following:

a PRA defined in the 3GPP, at least one TAI, at least one RAI, and geographical position information from GPS positioning.

Optionally, in this embodiment of this application, other information that can used to indicate the position of the terminal device may be used for representation. This is not limited in this embodiment of this application.

Optionally, the target policy in this embodiment of this application may include a WLANSP and/or a URSP. For example, the target policy may include at least one rule in the WLANSP and/or at least one rule in the URSP.

Figure 3:
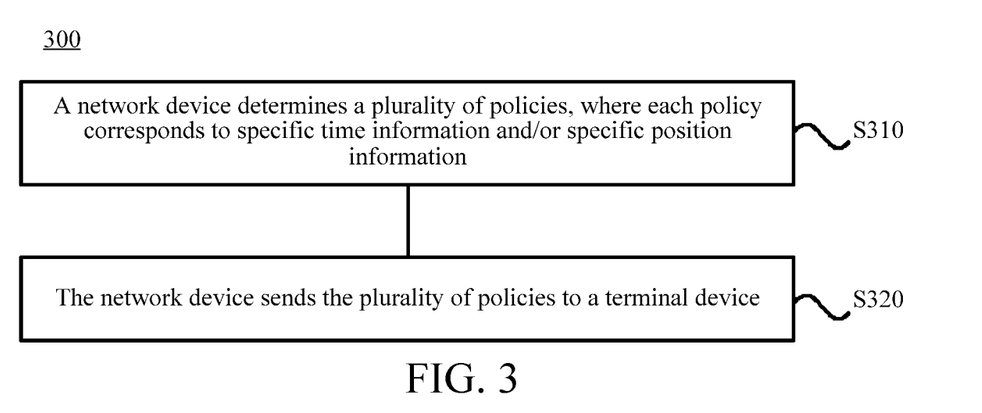
FIG. 3 is a schematic flowchart of an information transmission method according to another embodiment of this application.

FIG. 3 shows an information transmission method according to another embodiment of this application. The method 300 may be performed by the network device in the communications system 100 shown in FIG. 1. As shown in FIG. 3, the method 300 may include the following content:

S310: The network device determines a plurality of policies, where each policy corresponds to specific time information and/or specific position information.

S320: The network device sends the plurality of policies to the terminal device.

In this embodiment, a network device may determine a plurality of policies, where each policy may correspond to corresponding time information and/or specific position information. That is, the network device may determine different policies according to different time periods and/or different positions, and then may send the determined policies to a terminal device, so that the terminal device determines, according to current time information and/or current position information of the terminal device, a policy to use. Further, the terminal device may select a network or establish a PDU session according to the target policy.

Optionally, in some embodiments, the position information includes at least one of the following:

a PRA defined in the 3GPP, at least one TAI, at least one RAI, and geographical position information from GPS positioning.

Optionally, in some embodiments, each policy includes a WLANSP and/or a URSP.

Optionally, in some embodiments, each policy includes at least one rule in the WLANSP and/or at least one rule in the URSP.

The information transmission methods according to the embodiments of this application are described above with reference to FIG. 2 and FIG. 3 from the perspective of the network device. Information transmission methods according to other embodiments of this application are described below with reference to FIG. 4 to FIG. 5 from the perspective of a terminal device. It should be understood that, the descriptions of a terminal device side correspond to the descriptions of a network device side, and reference may be made to the foregoing for similar descriptions. To avoid repetition, details are not described herein again.

Figure 4:
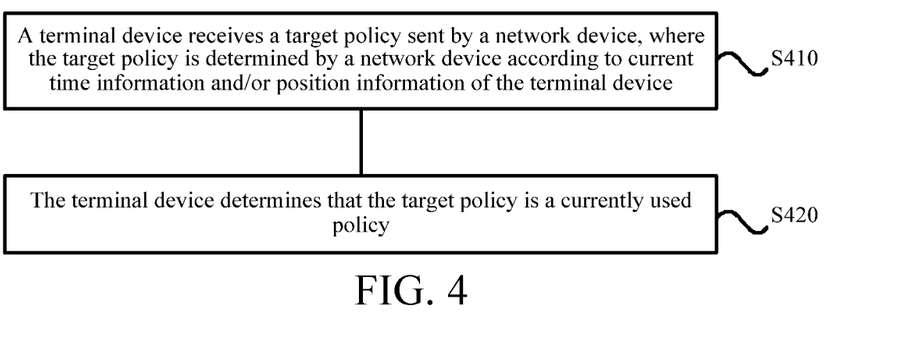
FIG. 4 is a schematic flowchart of an information transmission method according to still another embodiment of this application.

FIG. 4 is a schematic flowchart of an information transmission method according to another embodiment of this application. The method 400 may be performed by the terminal device in the communications system 100 shown in FIG. 1. As shown in FIG. 4, the method 400 may include the following content:

S410: The terminal device receives a target policy sent by a network device, where the target policy is determined by the network device according to current time information and/or position information of the terminal device.

S420: The terminal device determines that the target policy is a currently used policy.

The target policy is used to indicate a parameter used by the terminal device to select a network or establish a PDU session, or may be used to indicate another parameter. Therefore, the terminal device may select a network, establish a PDU session according to the target policy, or perform another operation.

Optionally, in some embodiments, the position information includes at least one of the following:

a PRA defined in the 3GPP, at least one TAI, at least one RAI, and geographical position information from GPS positioning.

Optionally, in some embodiments, the target policy includes a WLANSP and/or a URSP.

Optionally, in some embodiments, the target policy includes at least one rule in the WLANSP and/or at least one rule in the URSP.

Optionally, in some embodiments, the method 400 further includes:

if the position information of the terminal device changes, receiving, by the terminal device, an updated target policy sent by the network device, where the updated target policy is determined according to changed position information of the terminal device.

Figure 5:
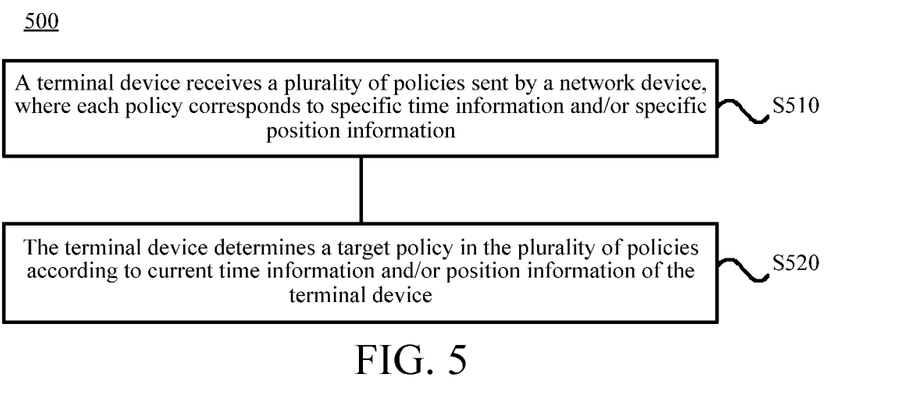
FIG. 5 is a schematic flowchart of an information transmission method according to still another embodiment of this application.

FIG. 5 is a schematic flowchart of an information transmission method according to another embodiment of this application. The method 500 may be performed by the terminal device in the communications system 100 shown in FIG. 1. As shown in FIG. 5, the method 500 may include the following content:

S510: The terminal device receives a plurality of policies sent by a network device, where each policy corresponds to specific time information and/or specific position information.

S520: The terminal device determines a target policy in the plurality of policies according to current time information and/or position information of the terminal device.

Optionally, in this embodiment of this application, the terminal device may switch between the plurality of policies according to a specific period or a specific condition. In this case, the network device does not need to update the policy of the terminal device in real time.

Optionally, in some embodiments, the method 500 further includes:

selecting, by the terminal device, a network or establishing a PDU session according to the target policy.

Optionally, in some embodiments, the position information includes at least one of the following:

a PRA defined in the 3GPP, at least one TAI, at least one RAI, and geographical position information from GPS positioning.

Optionally, in some embodiments, each policy includes a WLANSP and/or a URSP.

Optionally, in some embodiments, each policy includes at least one rule in the WLANSP and/or at least one rule in the URSP.

Optionally, in some embodiments, if the plurality of policies do not include a policy for the current time information and/or the position information, the method 500 further includes:

determining, by the terminal device, a default policy as the target policy; or sending, by the terminal device, a request message to the network device, where the request message is used to request a policy for the current time information and/or the position information.

The method embodiments of this application are described above in detail with reference to FIG. 2 to FIG. 5. The apparatus embodiments of this application are described below in detail with reference to FIG. 6 to FIG. 11. It should be understood that, the apparatus embodiments and the method embodiments correspond to each other. For similar descriptions, refer to the method embodiments.

Figure 6:
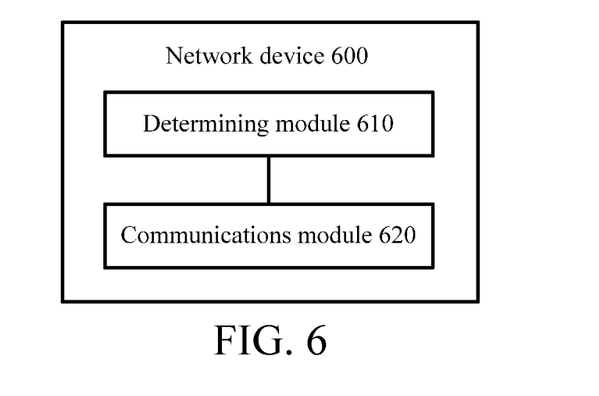
FIG. 6 is a schematic block diagram of a network device according to an embodiment of this application.

FIG. 6 is a schematic block diagram of a network device according to an embodiment of this application. The network device 600 shown in FIG. 6 includes:

a determining module 610, configured to determine a target policy corresponding to a terminal device according to current time information and/or position information of the terminal device; and a communications module 620, configured to send the target policy to the terminal device.

Optionally, in some embodiments, the position information includes at least one of the following:

a PRA defined in the 3GPP, at least one TAI, at least one RAI, and geographical position information from GPS positioning.

Optionally, in some embodiments, the target policy includes a WLANSP and/or a URSP.

Optionally, in some embodiments, the target policy includes at least one rule in the WLANSP and/or at least one rule in the URSP.

Optionally, in some embodiments, the network device is a policy control function (PCF) entity, and the network device 600 further includes:

an obtaining module, configured to obtain the position information of the terminal device from an AMF.

Optionally, in some embodiments, the determining module 610 is further configured to:

if the position information of the terminal device changes, determine, by the network device, an updated target policy according to changed position information of the terminal device; and the communications module 620 is further configured to:

send the updated target policy to the terminal device.

Optionally, in some embodiments, the target policy is used to indicate a parameter used by the terminal device to select a network or establish a PDU session.

Optionally, in some embodiments, the determining module 610 is specifically configured to:

determine, according to the current time information and/or the position information of the terminal device and a correspondence, a target policy corresponding to the terminal device.

Optionally, in some embodiments, the correspondence is a first correspondence between position information of the terminal device and a policy, or a second correspondence between time information and a policy, or a third correspondence between time information and position information of the terminal device and a policy.

Specifically, the network device 600 may correspond to (for example, the network device 600 may be configured as or may be) the network device described in the foregoing method 200, and the modules or units in the network device 600 are configured to perform various actions or processing processes performed by the network device in the foregoing method 200. Herein, to avoid repetition, detailed descriptions are omitted.

Figure 7:
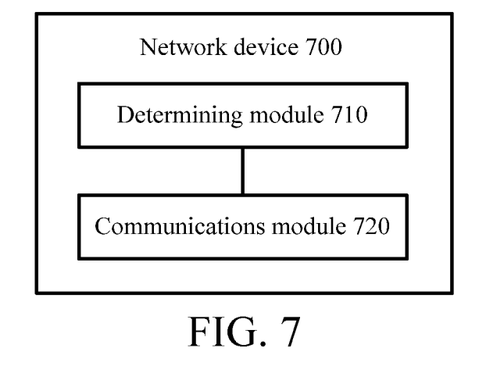
FIG. 7 is a schematic block diagram of a network device according to another embodiment of this application.

FIG. 7 is a schematic block diagram of a network device according to an embodiment of this application. The network device 700 shown in FIG. 7 includes:

a determining module 710, configured to determine a plurality of policies, where each policy corresponds to specific time information and/or specific position information; and a communications module 720, configured to send the plurality of policies to the terminal device.

Optionally, in some embodiments, the position information includes at least one of the following:

a PRA defined in the 3GPP, at least one TAI, at least one RAI, and geographical position information from GPS positioning.

Optionally, in some embodiments, each policy includes a WLANSP and/or a URSP.

Optionally, in some embodiments, each policy includes at least one rule in the WLANSP and/or at least one rule in the URSP.

Optionally, in some embodiments, each policy is used to indicate a parameter used by the terminal device to select a network or establish a PDU session.

Specifically, the network device 700 may correspond to (for example, the network device 700 may be configured as or may be) the network device described in the foregoing method 300, and the modules or units in the network device 700 are configured to perform various actions or processing processes performed by the network device in the foregoing method 300. Herein, to avoid repetition, detailed descriptions are omitted.

Figure 8:
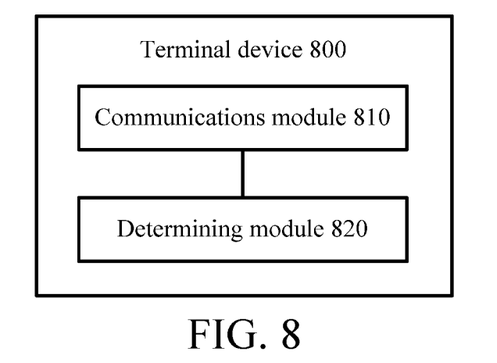
FIG. 8 is a schematic block diagram of a terminal device according to an embodiment of this application.

FIG. 8 is a schematic block diagram of a terminal device according to an embodiment of this application. The terminal device 800 shown in FIG. 8 includes:

a communications module 810, configured to receive a target policy sent by a network device, where the target policy is determined by the network device according to current time information and/or position information of the terminal device; and a determining module 820, configured to determine the target policy as a currently used policy.

Optionally, in some embodiments, the position information includes at least one of the following:

a PRA defined in the 3GPP, at least one TAI, at least one RAI, and geographical position information from GPS positioning.

Optionally, in some embodiments, the target policy includes a WLANSP and/or a URSP.

Optionally, in some embodiments, the target policy includes at least one rule in the WLANSP and/or at least one rule in the URSP.

Optionally, in some embodiments, the terminal device 800 further includes:

an execution module, configured to select a network or establish a PDU session according to the target policy.

Optionally, in some embodiments, the communications module 810 is further configured to:

if the position information of the terminal device changes, receive an updated target policy sent by the network device, where the updated target policy is determined according to changed position information of the terminal device.

Specifically, the terminal device 800 may correspond to (for example, the terminal device 800 may be configured as or may be) the network device described in the foregoing method 400, and the modules or units in the terminal device 800 are configured to perform various actions or processing processes performed by the network device in the foregoing method 400. Herein, to avoid repetition, detailed descriptions are omitted.

Figure 9:
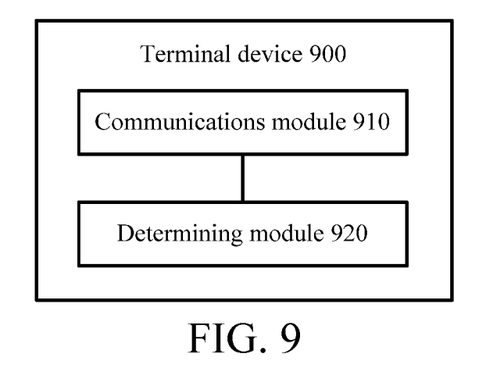
FIG. 9 is a schematic block diagram of a terminal device according to another embodiment of this application.

FIG. 9 is a schematic block diagram of a terminal device according to an embodiment of this application. The terminal device 900 shown in FIG. 9 includes:

a communications module 910, configured to receive a plurality of policies sent by a network device, where each policy corresponds to specific time information and/or specific position information; and a determining module 920, configured to determine a target policy in the plurality of policies according to current time information and/or position information of the terminal device.

Optionally, in some embodiments, the position information includes at least one of the following:

a PRA defined in the 3GPP, at least one TAI, at least one RAI, and geographical position information from GPS positioning.

Optionally, in some embodiments, each policy includes a WLANSP and/or a URSP.

Optionally, in some embodiments, each policy includes at least one rule in the WLANSP and/or at least one rule in the URSP.

Optionally, in some embodiments, if the plurality of policies do not include a policy for the current time information and/or the position information, the determining module 920 is further configured to:

determine a default policy as the target policy; or the communications module 910 is further configured to:

send a request message to the network device, where the request message is used to request a policy for the current time information and/or the position information.

Optionally, in some embodiments, the terminal device 900 further includes:

an execution module, configured to select a network or establish a PDU session according to the target policy.

Specifically, the terminal device 900 may correspond to (for example, the terminal device 900 may be configured as or may be) the network device described in the foregoing method 500, and the modules or units in the terminal device 500 are configured to perform various actions or processing processes performed by the network device in the foregoing method 500. Herein, to avoid repetition, detailed descriptions are omitted.

Figure 10:
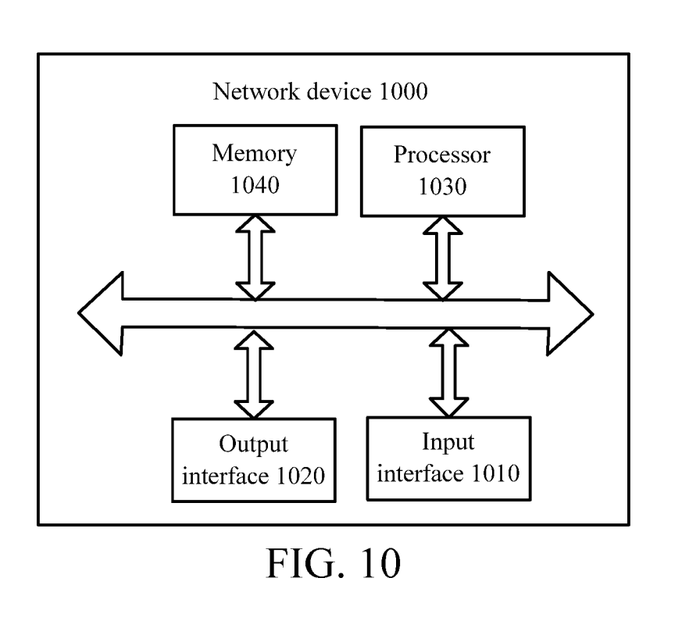
FIG. 10 is a schematic block diagram of a network device according to still another embodiment of this application.

As shown in FIG. 10, an embodiment of this application further provides a network device 1000. The network device 1000 may be the network device 600 in FIG. 6 or the network device 700 in FIG. 7, and can be configured to perform the content corresponding to the network device in the method 200 in FIG. 2 or the method 300 in FIG. 3. The network device 1000 includes an input interface 1010, an output interface 1020, a processor 1030, and a memory 1040. The input interface 1010, the output interface 1020, the processor 1030, and the memory 1040 may be connected by using a bus system. The memory 1040 is configured to store a program, an instruction or code. The processor 1030 is configured to execute the program, instruction or code in the memory 1040, to control the input interface 1010 to receive a signal and control the output interface 1020 to send a signal, to complete the operations in the method embodiments.

It should be understood that, in this embodiment of this application, the processor 1030 may be a central processing unit (CPU). The processor 1030 may be another general purpose processor, a digital signal processor (DSP), an application specific integrated circuit (ASIC), a field programmable gate array (FPGA) or another programmable logic device, a discrete gate or a transistor logic device, a discrete hardware component or the like. The general purpose processor may be a microprocessor, or the processor may be any conventional processor or the like.

The memory 1040 may include a read-only memory (ROM) and a random access memory (RAM), and provide an instruction and data to the processor 1030. A part of the memory 1040 may further include a non-volatile RAM. For example, the memory 1040 may further store device type information.

In an implementation process, each piece of content of the foregoing methods may be implemented by a hardware-integrated logic circuit in the processor 1030 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a PROM, an electrically-erasable programmable memory or a register. The storage medium is located in the memory 1040, and the processor 1030 reads information in the memory 1040 and completes the content in the foregoing methods in combination with hardware of the processor. To avoid repetition, details are not described herein again.

In a specific implementation, the determining module 610 and the obtaining module included in the network device 600 in FIG. 6 may be implemented by the processor 1030 in FIG. 10. The communications module 620 included in the network device 600 in FIG. 6 may be implemented by the input interface 1010 and the output interface 1020 in FIG. 10.

In another specific implementation, the determining module 710 included in the network device 700 in FIG. 7 may be implemented by the processor 1030 in FIG. 10, and the communications module 720 included in the network device 700 in FIG. 7 may be implemented by the input interface 1010 and the output interface 1020 in FIG. 10.

Figure 11:
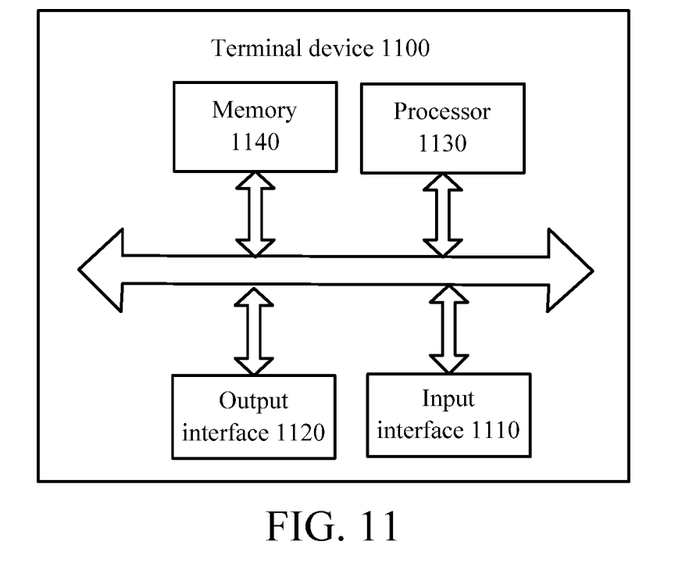
FIG. 11 is a schematic block diagram of a terminal device according to still another embodiment of this application.

As shown in FIG. 11, an embodiment of this application further provides a terminal device 1100. The terminal device 1100 may be the terminal device 800 in FIG. 8 or the terminal device 900 in FIG. 9, and can be configured to perform content corresponding to the terminal device in the method 400 in FIG. 4 or the method 500 in FIG. 5. The terminal device 1100 includes an input interface 1110, an output interface 1120, a processor 1130, and a memory 1140. The input interface 1110, the output interface 1120, the processor 1130, and the memory 1140 may be connected by using a bus system. The memory 1140 is configured to store a program, an instruction or code. The processor 1130 is configured to execute the program, instruction or code in the memory 1140, to control the input interface 1110 to receive a signal and control the output interface 1120 to send a signal, to complete the operations in the method embodiments.

It should be understood that, in this embodiment of this application, the processor 1130 may be a CPU. The processor 1130 may be another general purpose processor, a DSP, an ASIC, an FPGA or another programmable logic device, a discrete gate or a transistor logic device, a discrete hardware component or the like. The general purpose processor may be a microprocessor, or the processor may be any conventional processor or the like.

The memory 1140 may include a ROM and a RAM, and provide an instruction and data to the processor 1130. A part of the memory 1140 may further include a non-volatile RAM. For example, the memory 1140 may further store device type information.

In an implementation process, each piece of content of the foregoing methods may be implemented by a hardware-integrated logic circuit in the processor 1130 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a PROM, an electrically-erasable programmable memory or a register. The storage medium is located in the memory 1140, and the processor 1130 reads information in the memory 1140 and completes the content in the foregoing methods in combination with hardware of the processor. To avoid repetition, details are not described herein again.

In a specific implementation, the communications module 810 included in the terminal device 800 in FIG. 8 may be implemented by the input interface 1110 and the output interface 1120 in FIG. 11. The determining module 820 and the execution module included in the terminal device 800 in FIG. 8 may be implemented by the processor 1130 in FIG. 11.

In another specific implementation, the communications module 910 included in the terminal device 900 in FIG. 9 may be implemented by the input interface 1110 and the output interface 1120 in FIG. 11. The determining module 920 and the execution module included in the terminal device 900 in FIG. 9 may be implemented by the processor 1130 in FIG. 11.

An embodiment of this application further provides a computer readable storage medium. The computer readable storage medium stores one or more programs, the one or more programs include an instruction, and when the instruction is executed by a portable electronic device including a plurality of applications, the portable electronic device is enabled to perform the methods in the embodiment shown in FIG. 2 to FIG. 5.

An embodiment of this application further provides a computer program. The computer program includes an instruction, and when the computer program is executed on a computer, the computer is enabled to perform a corresponding procedure of the methods in the embodiment shown in FIG. 2 to FIG. 5.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The software product is stored in a storage medium, and includes several instructions for instructing a computer device (which may be a personal computer, a server, a network device or the like) to perform all or some of the steps of the methods described in the embodiments of this application. The foregoing storage medium includes: any medium that can store program codes, such as a USB flash disk, a removable hard disk, a ROM, a RAM, a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for information transmission, comprising:
    determining, by a network device, a plurality of policies, wherein each policy corresponds to specific position information and time information; and
    sending, by the network device, the plurality of policies to a terminal device, causing the terminal device to determine a target policy from the plurality of policies according to current position information and time information of the terminal device, wherein the target policy is used to indicate a parameter used by the terminal device to select a network or establish a protocol data unit (PDU) session,
    wherein the target policy comprises a wireless local area network selection policy (WLANSP); and
    wherein the position information comprises a presence reporting area (PRA) defined in 3rd Generation Partnership Project (3GPP) and at least one tracking area identity (TAI),
    wherein the method further comprises:
    determining, by the network device, a rule according to the current position information and time information of the terminal device; and
    sending, by the network device, a policy constituted by the rule to the terminal device,
    wherein a correspondence between the specific position information and time information, and the rule is pre-stored in the network device.

2. The method according to claim 1, wherein the network device is a policy control function (PCF) entity, and the method further comprises:
    receiving, by the network device, position information of the terminal device from an access and mobility management function (AMF);
    determining, by the network device in response to a change of the position information of the terminal device, an updated target policy; and
    sending, by the network device, the updated target policy to the terminal device.

3. A network device, comprising a processor, a memory, a transceiver, and one or more programs stored in the memory that, when executed by the processor, cause the network device to:
- determine a plurality of policies, wherein each policy corresponds to specific position information and time information; and
- send, via the transceiver, the plurality of policies to a terminal device, causing the terminal device to determine a target policy from the plurality of policies according to current position information and time information of the terminal device, wherein the target policy is used to indicate a parameter used by the terminal device to select a network or establish a protocol data unit (PDU) session,
- wherein the target policy comprises a wireless local area network selection policy (WLANSP); and
- wherein the position information comprises a presence reporting area (PRA) defined in 3rd Generation Partnership Project (3GPP) and at least one tracking area identity (TAI),
- wherein the one or more programs further cause the network device to:
- determine a rule according to the current position information and time information of the terminal device; and
- send, via the transceiver, a policy constituted by the rule to the terminal device,
- wherein a correspondence between the specific position information and time information, and the rule is prestored in the network device.

4. The network device according to claim 3, wherein the network device is a policy control function (PCF) entity, and the one or more programs further cause the network device to:
- receive, via the transceiver, position information of the terminal device from an access and mobility management function (AMF);
- determine, in response to a change of the position information of the terminal device, an updated target policy; and
- send, via the transceiver, the updated target policy to the terminal device.

5. A terminal device, comprising a processor, a memory, a transceiver, and one or more programs stored in the memory that, when executed by the processor, cause the terminal device to:
- receive, via the transceiver, a plurality of policies from a network device, wherein each policy corresponds to specific position information and time information; and
- determine a target policy from the plurality of policies according to current position information and time information of the terminal device, wherein the target policy is used to indicate a parameter used by the terminal device to select a network or establish a protocol data unit (PDU) session,
- wherein the target policy comprises a wireless local area network selection policy (WLANSP); and
- wherein the position information comprises a presence reporting area (PRA) defined in 3rd Generation Partnership Project (3GPP) and at least one tracking area identity (TAI),
- wherein the one or more programs further cause the terminal device to:
- receive, via the transceiver, a policy constituted by a rule from the network device,
- wherein the rule is determined by the network device according to the current position information and time information of the terminal device, and a correspondence between the specific position information and time information, and the rule is prestored in the network device.

6. The terminal device according to claim 5, wherein the network device is a policy control function (PCF) entity, and the one or more programs further cause the terminal device to:
- receive, via the transceiver, an updated target policy from the network device, wherein the updated target policy is determined by the network device in response to a change of position information of the terminal device, and the position information of the terminal device is received by the network device from an access and mobility management function (AMF).

* * * * *